United States Patent
Hanafusa

(10) Patent No.: US 11,604,203 B2
(45) Date of Patent: Mar. 14, 2023

(54) PREPROCESSING APPARATUS

(71) Applicant: SHIMADZU CORPORATION, Kyoto (JP)

(72) Inventor: Nobuhiro Hanafusa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 591 days.

(21) Appl. No.: 16/718,330

(22) Filed: Dec. 18, 2019

(65) Prior Publication Data

US 2020/0200780 A1 Jun. 25, 2020

(30) Foreign Application Priority Data

Dec. 19, 2018 (JP) .............................. JP2018-237110

(51) Int. Cl.
*G01N 35/02* (2006.01)
*G01N 35/10* (2006.01)
*G01N 35/04* (2006.01)

(52) U.S. Cl.
CPC ....... *G01N 35/025* (2013.01); *G01N 35/1002* (2013.01); *G01N 35/1065* (2013.01); *G01N 35/1081* (2013.01); *G01N 2035/0441* (2013.01); *G01N 2035/0443* (2013.01); *G01N 2035/0453* (2013.01)

(58) Field of Classification Search
CPC ............. G01N 35/025; G01N 35/1002; G01N 35/1065; G01N 35/1081; G01N 2035/0441; G01N 2035/0443; G01N 2035/0453; G01N 2035/1051; G01N 35/1079; F05B 2260/301; F05B 2260/31

See application file for complete search history.

(56) References Cited

U.S. PATENT DOCUMENTS

| 4,865,090 A * | 9/1989 | Burolla .............. G01N 35/1079 141/172 |
|---|---|---|
| 2011/0157580 A1 | 6/2011 | Nogami et al. |
| 2017/0138824 A1* | 5/2017 | Hanafusa ............. G01N 1/4005 |
| 2020/0225252 A1* | 7/2020 | Endo .................... G01N 35/026 |

FOREIGN PATENT DOCUMENTS

| EP | 3338890 A3 | 8/2018 |
| JP | 2010-60474 A | 3/2010 |
| JP | 3209316 U | 3/2017 |
| JP | 2018-004327 A | 1/2018 |

OTHER PUBLICATIONS

Office Action dated Aug. 23, 2022 in Japanese Application No. 2018-237110.

* cited by examiner

*Primary Examiner* — Jill A Warden
*Assistant Examiner* — John McGuirk
(74) *Attorney, Agent, or Firm* — Sughrue Mion, PLLC

(57) ABSTRACT

A pretreatment device for performing pretreatment using a liquid sucked by a probe from an inside of a septum-attached container includes: a container holding unit which has a space for accommodating the septum-attached container and is provided with a hole into which the probe is inserted with respect to a septum of the septum-attached container to be stored; an installation unit in which the container holding unit is detachably installed; and a fixing unit which fixes the container holding unit to the installation unit in a state where the container holding unit is detachably installed in the installation unit, to solve the above-described problem.

6 Claims, 14 Drawing Sheets

PREPROCESSING APPARATUS

RELATED APPLICATIONS

The present application is based on, and claims priority from JP Application Serial Number 2018-237110, filed Dec. 19, 2018, the disclosure of which is hereby incorporated by reference herein in its entirety.

BACKGROUND OF THE INVENTION

Field of the Invention

The present invention relates to a pretreatment device for performing pretreatment using a liquid sucked by a probe from an inside of a septum-attached container.

Background Art

When analyzing components contained in a sample, for example, whole blood, serum, dried blood spots, or urine, derived from a living body, in some cases, the analysis is performed after performing pretreatment on the sample using a pretreatment device. Examples of the pretreatment include treatment of removing specific components unnecessary for analysis from a sample to extract necessary components or treatment of concentrating or drying an extracted sample. In the related art, various configurations have been proposed as pretreatment devices that automatically execute such pretreatment (for example, refer to JP-A-2010-60474).

In some cases, liquids such as a reagent used for pretreatment or an internal standard liquid are accommodated in a septum-attached container for preventing concentration due to evaporation (for example, refer to Japanese Registered Utility Model No. 3209316). The septum-attached container is installed in a container installation unit of a pretreatment device. When using a liquid in such a septum-attached container, a probe is moved to penetrate the septum, and a distal end of the probe is inserted into the sealed container. In this state, the liquid in the container is sucked from the distal end of the probe which is then withdrawn from the septum and moves to a dispensing position.

When the probe is withdrawn from the septum, in some cases, the septum-attached container floats from the container installation unit together with the probe due to a frictional resistance between the probe and the septum. A pretreatment device including a container installation unit, a container holder, and a claw portion has been proposed as technology for preventing this phenomenon (for example, refer to JP-A-2018-4327). A septum-attached container is installed in the container installation unit. The container holder is detachable from the container installation unit and accommodates the septum-attached container inserted from an opening portion. The claw portion prevents the septum-attached container from floating from the container holder.

SUMMARY OF THE INVENTION

When a probe is withdrawn from a septum as described above, in some cases, a septum-attached container floats from a container installation unit together with the probe due to a frictional resistance between the probe and the septum. In such a case, there is a concern that analysis may stop due to an error caused by movement of the container together with the probe during movement of the probe (while rising, rotating, or the like). In addition, even in a case where the probe is withdrawn from the septum in the middle of movement, there is a concern that analysis results vary since the amount of a liquid dispensed using the probe if the liquid in the container is attached to a distal end of the probe or the liquid sucked in the probe leaks due to an external force received by the probe, In the technology proposed in JP-A-2018-4327, when the septum-attached container is inserted into the container holder from the opening portion, the claw portion comes into contact with the outer surface of the septum-attached container, elastically deforms, and is retracted from the position opposite to the opening portion to insert the septum-attached container into the opening portion.

However, in JP-A-2018-4327, it is difficult to adjust the claw portion so as to be elastically deformable, or to select the material.

The present invention has been made in consideration of the above-described circumstances, and an object of the present invention is to provide a pretreatment device that can more efficiently and reliably prevent the septum-attached container from floating from the container installation unit.

A pretreatment device according to an aspect of the present invention is a pretreatment device for performing pretreatment using a liquid sucked by a probe from an inside of a septum-attached container, the pretreatment device including a container holding unit, an installation unit, and a fixing unit. The container holding unit has a space for accommodating the septum-attached container and holds the septum-attached container from a side surface direction, a vertical direction opposite to the side surface direction in the space, and provided with a hole into which the probe is inserted with respect to the septum of the septum-attached container to be stored. The container holding unit is detachably installed in the installation unit. The fixing unit fixes the container holding unit to the installation unit in a state where the container holding unit is detachably installed in the installation unit.

The container holding unit includes a container holder member and a cap member. The container holder member has an opening in one end surface, internally holds the septum-attached container in a space for accommodating the septum-attached container, and is fixed to the installation unit by bringing a part of the container holding unit into abutment against the fixing unit. The cap member which is provided with the hole and is attached to the upper end portion of the container holder member holds the septum-attached container to be stored from the vertical direction.

The container holder member may be made of resin or aluminum.

The fixing unit includes a shaft portion and a flange portion. The shaft portion has a screw distal portion of a screw which is screwed into a screw hole provided in the surface of the installation unit. The flange portion is provided at a rear of the screw distal portion. The container holding unit has a cut-out portion. The cut-out portion, on which the flange portion of the fixing unit which is attached to the installation unit through screwing with the shaft portion abuts, is provided on an outer surface of container holding unit exposed from the installation unit in a case where the container holding unit is detachably installed in the installation unit.

The cut-out portion is provided on a part of the outer surface of the container holder member exposed from the installation unit in a case where the container holder member is detachably installed in the installation unit.

The installation unit is a rotary table in which one or a plurality of the container holding units may be detachably installed.

The installation unit may include a retraction portion. The fixing unit may be retracted and installed in a case where the container holding unit is not installed in retraction portion.

According to an aspect of the present invention, there is provided a pretreatment device that can more efficiently and reliably prevent the septum-attached container from floating from the container installation unit.

DETAILED DESCRIPTION OF THE INVENTION

Figure 1:
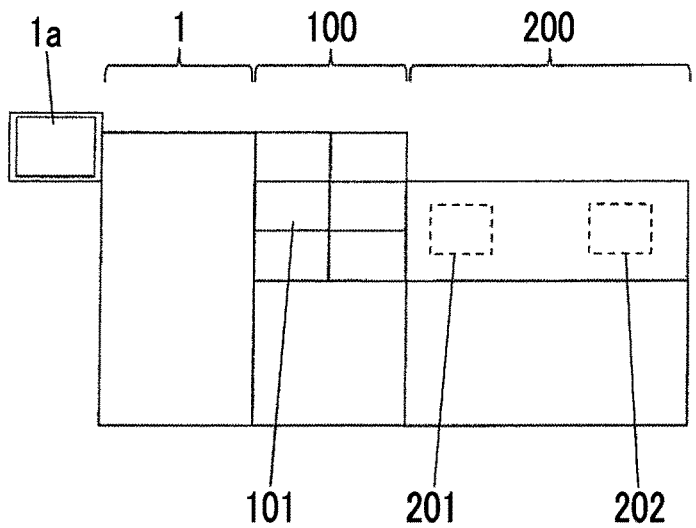
FIG. 1 is a schematic front view showing a configuration example of an analysis system including a pretreatment device according to an embodiment of the present invention.

FIG. 1 is a schematic front view showing a configuration example of an analysis system including a pretreatment device 1 according to an embodiment of the present invention. The analysis system includes the pretreatment device 1, a liquid chromatograph (LC) 100, and a mass spectrometer (MS) 200. A sample subjected to pretreatment using the pretreatment device 1 is sequentially introduced into the LC100 and the MS200 for analysis.

That is, the analysis system according to the present embodiment has a configuration in which the liquid chromatograph mass spectrometer (LC/MS) is connected to the pretreatment device 1. However, the present invention is not limited to such a configuration, and may have a configuration in which any one of the LC100 or MS200 may be omitted and a sample subjected to pretreatment using the pretreatment device 1 is introduced into any one of the LC100 or the MS200.

The pretreatment device 1 functions as a dispensing device that dispenses samples, for example, plasma, serum, and a caffeine aqueous solution, or reagents to be mixed with a sample, and various kinds of pretreatment such as filtration, agitation, and control of the temperature are performed on the samples and the reagents dispensed at dispensing positions. The samples after such kinds of pretreatment are performed are introduced into the LC100 through an automatic sampler 101 included in the LC100.

The LC100 includes columns (not shown in the drawing), and sample components separated in the process in which the samples pass through the columns are sequentially introduced into the MS200. The MS200 includes an ionization unit 201 which ionizes the sample introduced from the LC100 and a mass analysis unit 202 which analyzes the ionized sample.

The pretreatment device 1 includes an operation display unit 1a including, for example, a touch panel. An analyst can perform an input related to an operation of the pretreatment device 1 through an operation on a display screen of the operation display unit 1a and can confirm the information which is related to the operation of the pretreatment device 1 and displayed on the display screen of the operation display unit 1a. However, the present invention is not limited to the configuration provided with the touch panel-type operation display unit 1a, and may have a configuration in which, for example, a display unit consisting of a liquid crystal display and an operation unit consisting of an operation key are separately provided.

Figure 2:
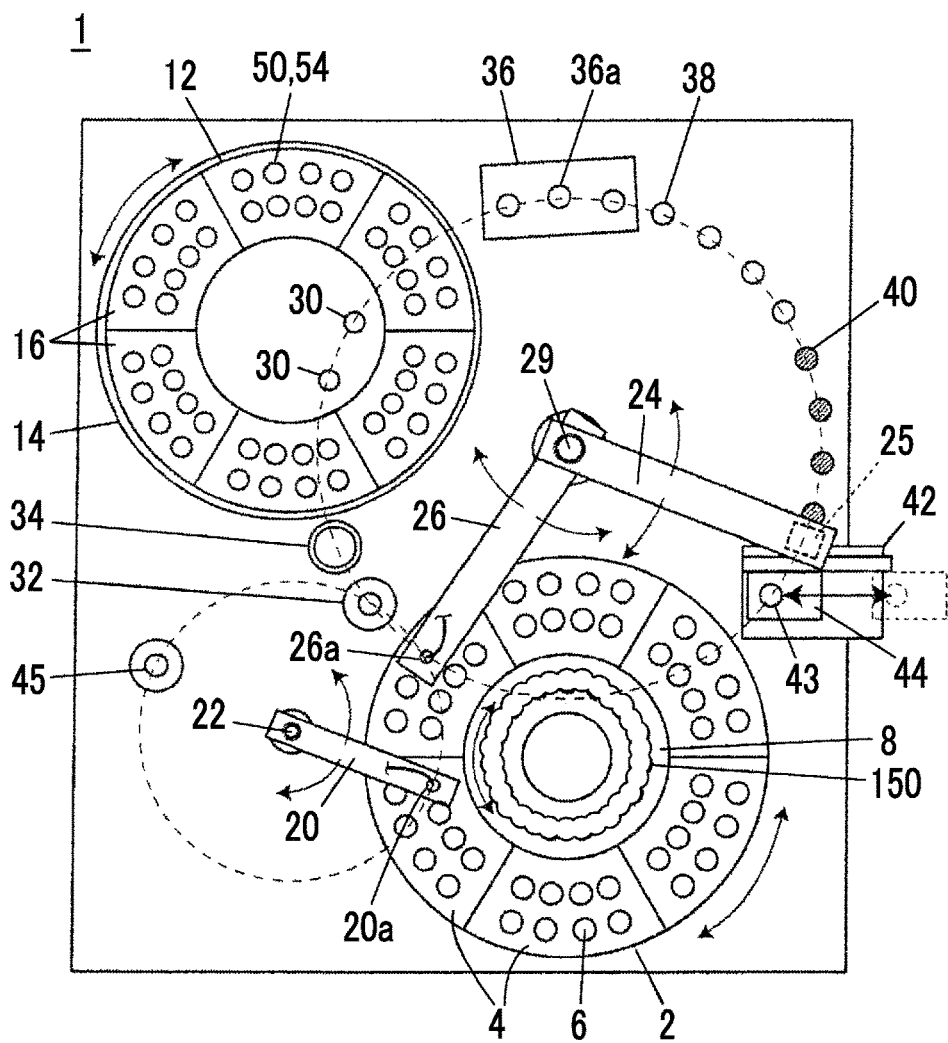
FIG. 2 is a plan view showing a configuration example of the pretreatment device.

FIG. 2 is a plan view showing a configuration example of the pretreatment device 1. In this pretreatment device 1, one pretreatment kit consisting of a pair of a separation container 50 and a collection container 54 is used for each sample to execute pretreatment (such as filtration, agitation, and control of the temperature) which has been set for each pretreatment kit.

A plurality of processing ports for executing pretreatment on samples dispensed at a dispensing port 32 are provided in the pretreatment device 1 in addition to the dispensing port 32 as a dispensing position. Accordingly, in a case where the pretreatment kit in which a sample is accommodated is installed in any processing port, pretreatment corresponding to each processing port is executed on the sample accommodated in the pretreatment kit.

A filtration port 30, a disposal port 34, an agitation port 36*a*, temperature control ports 38, 40, a transfer port 43, a cleaning port 45, and the like are provided as the processing ports in association with each kind of pretreatment. Each of the processing ports constitutes a plurality of pretreatment units which respectively execute a plurality of kinds of pretreatment.

The separation container 50 and the collection container 54 constituting the pretreatment kit are transported between the processing ports using a transporting arm 24 as a transporting unit. A holding unit 25 for holding the separation container 50 and the collection container 54 is formed on a distal end side of the transporting arm 24. A proximal side of the transporting arm 24 is rotatably held around a vertical shaft 29. The transporting arm 24 extends in a horizontal direction and rotates around the vertical shaft 29 to move so that the holding unit 25 draws a circular arc-shaped orbit in the horizontal plane. The processing ports which are transportation destination of the separation container 50 and the collection container 54 or other ports are all provided on the circular arc-shaped orbit drawn by the holding unit 25.

A sample is dispensed into the pretreatment kit from a sample container 6. A plurality of the sample containers 6 in which samples are accommodated can be provided in a sample installation unit 2, and the samples are sequentially collected from the sample containers 6 using a sample dispensing arm 20. A plurality of sample racks 4 holding the plurality of sample containers 6 are annularly arranged in the sample installation unit 2. The sample installation unit 2 rotates in the horizontal plane to move the sample racks 4 in the circumferential direction. Accordingly, it is possible to sequentially move each of the sample containers 6 at a predetermined sample collecting position.

Here, the sample collecting position is positioned on an orbit of a sample dispensing probe 20*a* provided at a distal portion of the sample dispensing arm 20, and a sample is sucked by the sample dispensing probe 20*a* from the sample container 6 at the sample collecting position. The sample in the sample container 6 is sucked by the sample dispensing probe 20*a* and is then dispensed by being discharged to the separation container 50 installed in the dispensing port 32.

The sample dispensing arm 20 is rotatable in the horizontal plane around a vertical shaft 22 provided on a proximal side and vertically movable in the vertical direction along the vertical shaft 22. The sample dispensing probe 20*a* is held so as to extend vertically downward at the distal portion of the sample dispensing arm 20. A movement to draw a circular arc-shaped orbit in the horizontal plane or a vertical movement in the vertical direction is performed depending on the operation of the sample dispensing arm 20.

The dispensing port 32 is provided at a position on the orbit of the sample dispensing probe 20*a* and the orbit of the holding unit 25 of the transporting arm 24. The dispensing port 32 is a port for dispensing a sample to an unused separation container 50 from the sample dispensing probe 20*a*. The unused separation container 50 is transported to the dispensing port 32 by the transporting arm 24.

A reagent installation unit 8 in which an installation hole 150 for installing a reagent container holding unit 140 (to be described below) in which the reagent container 10 is stored and held is formed is provided at a center portion of the sample installation unit 2 in which the sample racks 4 are annularly arranged. A reagent in the reagent container 10 in the reagent container holding unit 140 installed in the reagent installation unit 8 is collected using a reagent dispensing arm 26. The reagent dispensing arm 26 is supported by the vertical shaft 29 at the proximal portion similarly to the transporting arm 24, rotatable in the horizontal plane around the vertical shaft 29 and vertically movable in the vertical direction along the vertical shaft 29.

A reagent dispensing probe 26*a* is held at the distal portion of the reagent dispensing arm 26 so as to extend vertically downward. In the reagent dispensing probe 26*a*, a movement to draw the same circular arc-shaped orbit as that of the holding unit 25 of the transporting arm 24 in the horizontal plane or a vertical movement in the vertical direction is performed depending on the operation of the reagent dispensing arm 26.

The reagent installation unit 8 is a rotary table that can rotate in the horizontal plane independently of the sample installation unit 2. A plurality of reagent container holding units 140 (to be described below) which store and hold the reagent containers 10 are annularly arranged in the reagent installation unit 8. The reagent container holding units 140 which respectively hold the reagent containers 10 move in the circumferential direction through rotation of the reagent installation unit 8. Accordingly, it is possible to move the desired reagent containers 10 to predetermined reagent collecting positions.

Here, the reagent collecting position is positioned on the orbit of the reagent dispensing probe 26*a* provided at the distal portion of the reagent dispensing arm 26, and a reagent is sucked by the reagent dispensing probe 26*a* from a reagent container 10 held by a reagent container holding unit 140 at a reagent collecting position. The reagent in the reagent container 10 is sucked by the reagent dispensing probe 26*a*. Then, the reagent is dispensed by being discharged to a separation container 50 installed in the dispensing port 32 and added to a sample in the separation container 50.

The separation container 50 and the collection container 54 are held by a container holding unit 12 provided at a position different from the sample installation unit 2 or the reagent installation unit 8. A plurality of pairs of pretreatment kits in a state where an unused separation container 50 and a collection container 54 are superposed are annularly arranged in the container holding unit 12. The container holding unit 12 includes a rotary unit 14 rotating in the horizontal plane and a plurality of container racks 16 detachable from the rotary unit 14.

The container racks 16 can hold the plurality of pretreatment kits. The plurality of container racks 16 are annularly arranged on the rotary unit 14. An annular holding area which holds the plurality of pretreatment kits is formed by the plurality of container racks 16 which have been annularly arranged. The rotary unit 14 rotating in the horizontal plane displaces each of the container racks 16 in the circumferential direction of the holding area. Accordingly, it is possible to sequentially move the plurality of pretreatment kits to a predetermined transporting position. Here, the transporting position is positioned on the orbit of the holding unit 25 provided at the distal portion of the transporting arm 24. The separation container 50 or the collection container 54 is held by the holding unit 25 at the transporting position and transported to a port at a transportation destination.

In this manner, since the pretreatment kits are divided and held by the plurality of the container racks 16, each of the container racks 16 can be individually attached to and detached from the rotary unit 14. Accordingly, even in a case where treatment is performed on a separation container 50 or a collection container 54 held by any of the container racks 16, other container racks 16 can be attached to and detached from the rotary unit to perform a separate operation. Therefore, it is possible to improve the pretreatment efficiency.

However, the separation container 50 and the collection container 54 are not limited to have the configuration in which these are held by the container holding unit 12 using the container rack 16, and may have, for example, a configuration in which these are directly held by the container holding unit 12. In addition, the separation container 50 and the collection container 54 is not limited to have the configuration in which these are held by the container holding unit 12 in a state of being superposed on each other, and may have a configuration in which the separation container 50 and the collection container 54 are individually held. Furthermore, the plurality of container racks 16 is not limited to have a configuration in which these are annularly arranged, and may have, for example, a configuration in which these are arranged in a circular arc shape. In this case, the plurality of separation containers 50 and collection containers 54 are held in a holding area having a circular arc shape instead of an annular shape.

An analyst can install plural kinds (for example, two kinds) of separation containers 50, which have different kinds of separation performance and in which a separation layer is provided, in the container holding unit 12. The separation containers 50 are separately used depending on analysis items of samples and are selected by the container holding unit 12 depending on the analysis items designated by the analyzer for transportation. Here, the analysis items are types of analysis continuously performed using samples subjected to pretreatment in the pretreatment device 1, and are, for example, types of analysis performed by the LC100 or MS200.

Figure 3A:
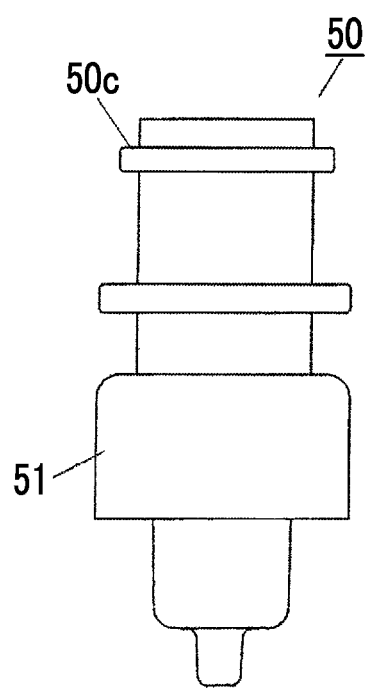
FIG. 3A is a side view showing a configuration example of a separation container.
Figure 3B:
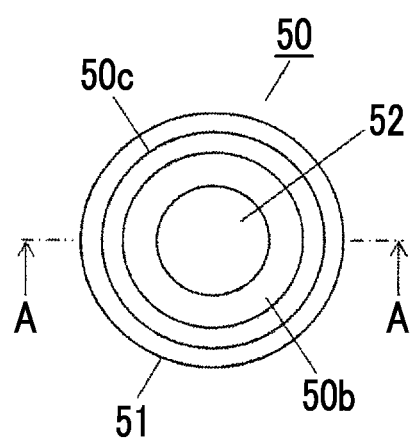
FIG. 3B is a plan view of the separation container of FIG. 3A.
Figure 3C:
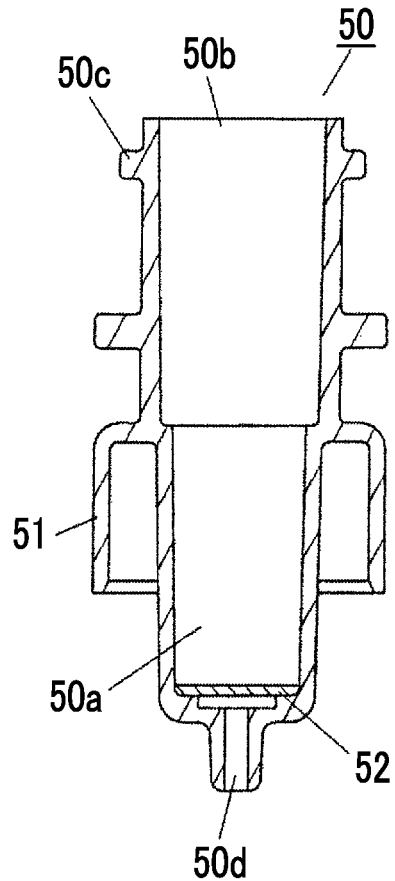
FIG. 3C is a cross-sectional view showing a cross section A-A of FIG. 3B.
Figure 4A:
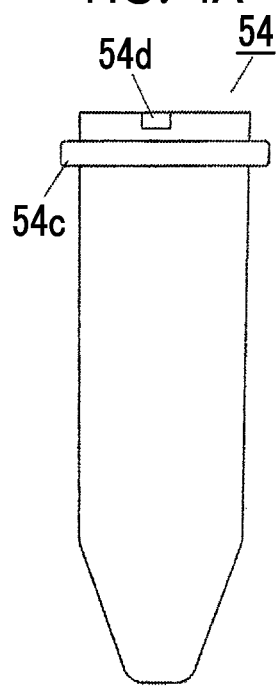
FIG. 4A is a side view showing a configuration example of a collection container.
Figure 4B:
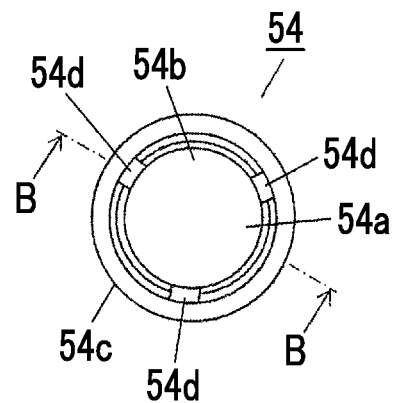
FIG. 4B is a plan view of the collection container of FIG. 4A.
Figure 4C:
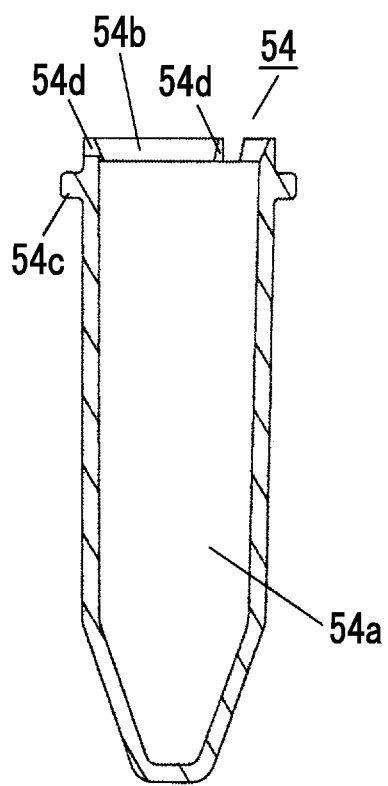
FIG. 4C is a cross-sectional view showing a cross section B-B of FIG. 4B.
Figure 5:
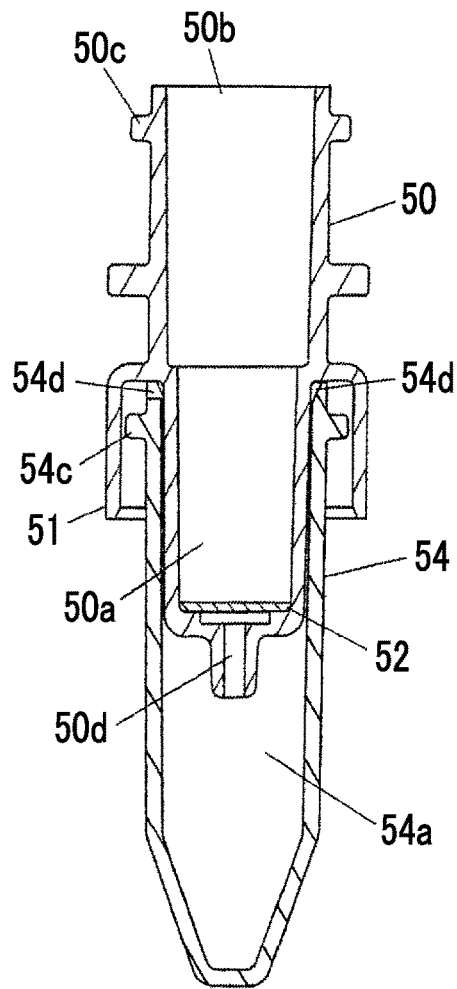
FIG. 5 is a cross-sectional view showing a pretreatment kit in a state where the separation container and the collection container are superposed.

FIG. 3A is a side view showing a configuration example of a separation container 50. FIG. 3B is a plan view of the separation container 50 of FIG. 3A. FIG. 3C is a cross-sectional view showing a cross section A-A of FIG. 3B. FIG. 4A is a side view showing a configuration example of a collection container 54. FIG. 4B is a plan view of the collection container 54 of FIG. 4A. FIG. 4C is a cross-sectional view showing a cross section B-B of FIG. 4B. FIG. 5 is a cross-sectional view showing a pretreatment kit in a state where the separation container 50 and the collection container 54 are superposed.

The separation container 50 is a cylindrical container having an internal space 50a for accommodating a sample or a reagent as shown in FIGS. 3A to 3C. A separation layer 52 is provided at the bottom of the internal space 50a. The separation layer 52 is a separation agent or a separation membrane which has a function of selectively separating specific components in a sample from each other by, for example, causing a physical or chemical reaction with specific components by passing the sample through the separation layer.

It is possible to use, for example, ion exchange resin, silica gel, cellulose, or activated carbon as the separation agent constituting the separation layer 52. In addition, it is possible to use, for example, a polytetrafluoroethylene (PTFE) membrane, a nylon membrane, a polypropylene membrane, a polyvinylidene fluoride (PVDF) membrane, an acrylic copolymer membrane, a mixed cellulose membrane, a nitrocellulose membrane, a polyether sulfone membrane, an ion-exchange membrane, or a glass fiber membrane as the separation membrane.

PTFE, an acrylic copolymer membrane, and the like can be used as a deproteinization filter (separation membrane) for removing proteins in a sample through filtration. In this case, a pre-filter (not shown in the drawing) may be provided on an upper side of the separation layer 52 in order to prevent clogging of the deproteinization filter. It is possible to use, for example, a nylon membrane, a polypropylene membrane, and a glass fiber membrane as such a pre-filter. The pre-filter is used for removing insoluble substances or foreign substances having a relatively large particle diameter from a sample. The pre-filter can prevent the deproteinization filter from being clogged due to insoluble substances or foreign substances having a relatively large particle diameter.

An opening 50b for injecting a sample or a reagent is formed on the upper surface of the separation container 50. In addition, an extraction port 50d for extracting a sample having passed through the separation layer 52 is formed on the lower surface of the separation container 50. A flange portion 50c for engaging the holding unit 25 of the transporting arm 24 is formed at an upper portion of the outer circumferential surface of the separation container 50 so as to protrude in the circumferential direction.

A skirt portion 51 coming into contact with an edge of the filtration port 30 when the separation container 50 is accommodated in the filtration port 30 together with the collection container 54 is provided at a center portion of the outer circumferential surface of the separation container 50. The skirt portion 51 protrudes from the outer circumferential surface of the separation container 50 in the circumferential direction and is formed in an L-shaped cross section so as to extend downward therefrom to form a constant space between the skirt portion and the outer circumferential surface of the separation container 50.

The collection container 54 is a bottomed cylindrical container that accommodates the lower portion of the separation container 50 and collects a sample extracted from the extraction port 50d of the separation container 50 as shown in FIGS. 4A to 4C and FIG. 5. An opening 54b into which the lower portion of the separation container 50 is inserted is formed on the upper surface of the collection container 54. An internal space 54a which accommodates the lower portion of the separation container than the skirt portion 51 is formed inside the collection container 54. Similarly to the separation container 50, a flange portion 54c for engaging the holding unit 25 of the transporting arm 24 is formed at an upper portion of the outer circumferential surface of the collection container 54 so as to protrude in the circumferential direction.

In a state where the separation container 50 and the collection container 54 are superposed as shown in FIG. 5, the upper portion of the collection container 54 enters the skirt portion 51. The outer diameter of the separation container 50 is formed smaller than the inner diameter of the collection container 54. Accordingly, a slight gap is formed between the inner circumferential surface of the collection container 54 and the outer circumferential surface of the separation container 50 accommodated in the internal space 54a of the collection container 54. The separation container 50 and the collection container 54 are installed in the container holding unit 12 in a state where the lower portion of the separation container 50 is accommodated in the collection container 54 (in the state of FIG. 5).

Three notches 54*d* are formed at the edge on the upper surface of the collection container 54. Accordingly, even in a state where the upper surface of the collection container 54 abuts on the inner surface of the skirt portion 51 through superposition of the separation container 50 and the collection container 54 as shown in FIG. 5, it is possible to allow communication between the inside and the outside of the collection container 54 through the notches 54*d*. However, the number of notches 54*d* is not limited to three, and may be less than or equal to two or greater than or equal to four. In addition, the present invention is not limited to the notches 54*d*, and may have, for example, a configuration in which a small hole is formed.

Referring again to FIG. 2, the filtration port 30 is provided inside the container holding unit 12. That is, an annular or circular arc-shaped holding area is formed by the plurality of container racks 16 arranged on the outer circumference of the filtration port 30, and a plurality of separation containers 50 and collection containers 54 are held in the holding area. In a case where the holding area of the separation containers 50 and the collection containers 54 is formed in an annular shape or a circular arc shape so as to secure a space for installing the filtration port 30 in an empty space of a center portion of the holding area in this manner, it is possible to achieve a more compact configuration.

In particular, in the present embodiment, the separation containers 50 and the collection containers 54 are held in the holding area in a superposed state, and therefore, it is unnecessary to separately provide holding areas for the separation containers 50 and the collection containers 54. Accordingly, it is possible to hold more separation containers 50 and collection containers 54 in a small holding area. Accordingly, it is possible to reduce the holding area of the separation containers 50 and the collection containers 54 and to achieve a more compact configuration.

In addition, in a case where the filtration port 30 is provided at the center portion of the holding area formed in an annular shape or a circular arc shape, it is possible to relatively shorten the distance between the filtration port 30 and the plurality of separation containers 50 and collection containers 54 held in the holding area. Accordingly, it is possible to shorten the time for transporting the separation containers 50 and the collection containers 54 to the filtration port 30, thereby improving the pretreatment efficiency.

The filtration port 30 constitutes a filtration portion in which a sample is separated in the separation layer 52 by applying pressure to the sample in a separation container 50. In the present embodiment, two filtration ports 30 are arranged on the orbit of the holding unit 25 of the transporting arm 24, for example. The separation containers 50 and the collection containers 54 are installed in each filtration port 30 in the superposed state as shown in FIG. 5 and a sample separated by a negative pressure in the separation layer 52 in a separation container 50 is collected in a collection container 54. However, the separation containers 50 and the collection containers 54 are not limited to have a configuration in which these are installed in each filtration port 30 in a state of being superposed on each other, and may have a configuration in which the separation containers 50 and the collection containers 54 are individually installed. In addition, the number of filtration ports 30 is not limited to two, and may be one or greater than or equal to three.

Three agitation ports 36*a* are arranged on the orbit of the holding unit 25 of the transporting arm 24 in an agitation unit 36 provided in the vicinity of the container holding unit 12, for example. The agitation unit 36 has a mechanism for periodically operating each agitation port 36*a* individually in the horizontal plane. With such a mechanism, it is possible to stir samples in the separation containers 50 arranged in each agitation port 36*a*. However, the number of agitation ports 36*a* is not limited to three, and may be less than or equal to two and greater than or equal to four.

The temperature control ports 38, 40 are provided in a thermally conductive block of which the temperature is controlled by, for example, a heater and a Peltier element, and the temperature of the separation container 50 or the collection container 54 accommodated in the temperature control ports 38, 40 is controlled at a constant temperature. The temperature control ports 38 are for the separation containers 50, and four temperature control ports are arranged, for example, on the orbit of the holding unit 25 of the transporting arm 24. The temperature control ports 40 are for collection containers 54, and four temperature control ports are arranged, for example, on the orbit of the holding unit 25 of the transporting arm 24 similarly to the temperature control ports 38 for the separation containers 50. However, the number of each of the temperature control ports 38, 40 is not limited to four, and may be less than or equal to three and greater than or equal to five.

Figure 6A:
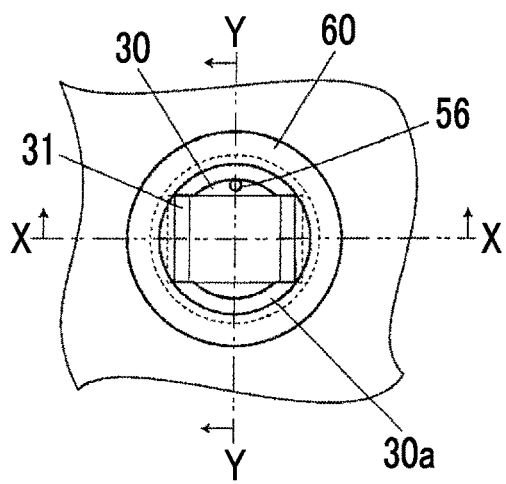
FIG. 6A is a plan view showing a configuration example of a filtration port.
Figure 6B:
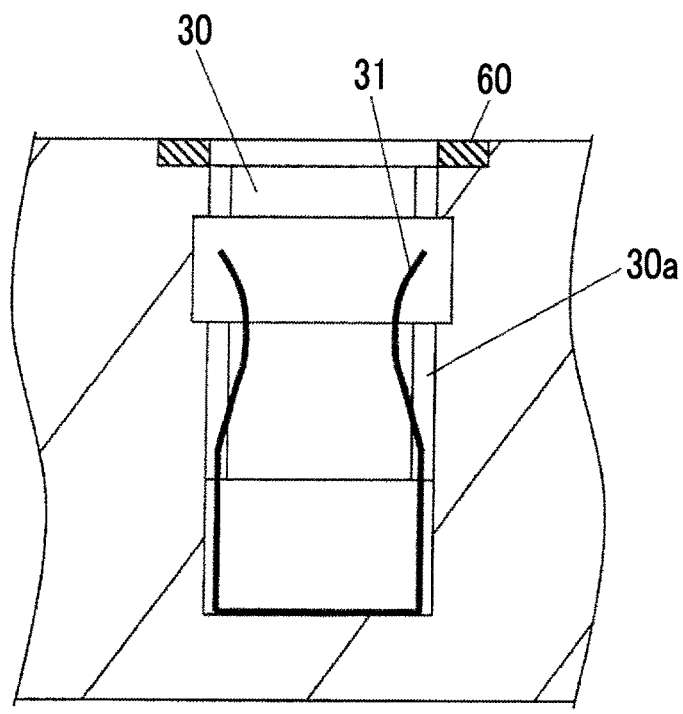
FIG. 6B is a cross-sectional view showing a cross section X-X of FIG. 6A.
Figure 6C:
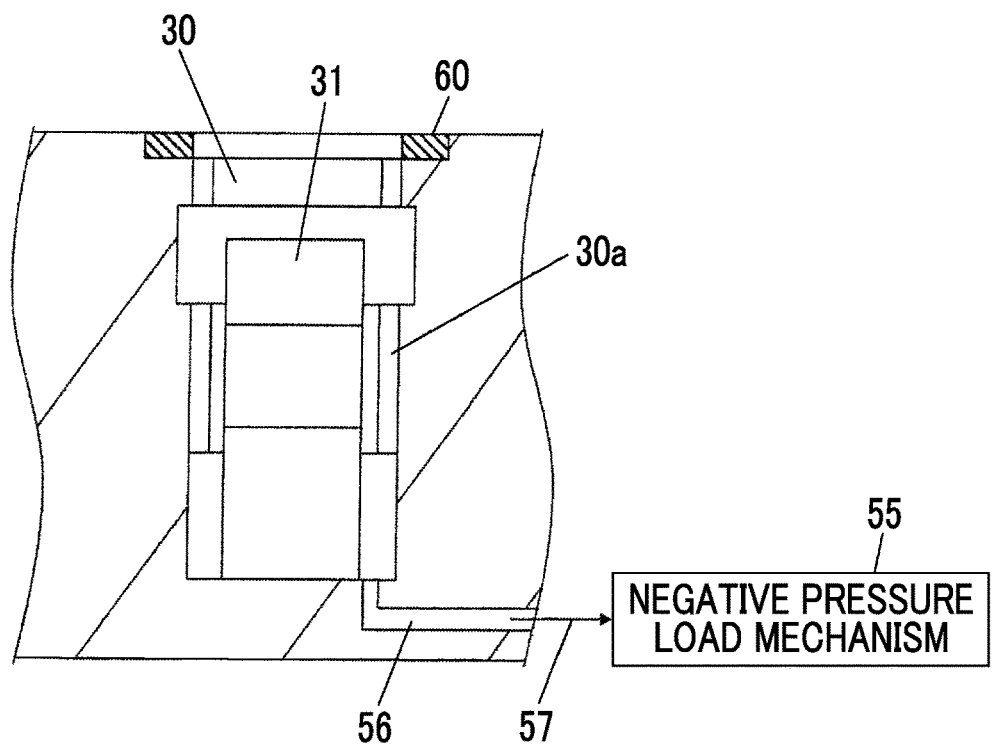
FIG. 6C is a cross-sectional view showing a cross section Y-Y of FIG. 6A.
Figure 6D:
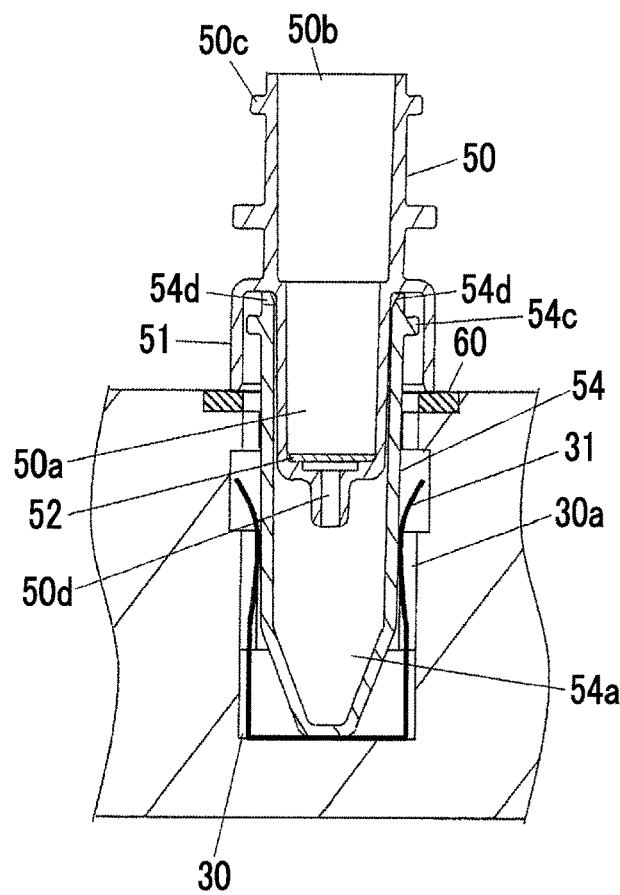
FIG. 6D is a cross-sectional view showing a state where the pretreatment kit is installed in the filtration port.

FIG. 6A is a plan view showing a configuration example of a filtration port 30. FIG. 6B is a cross-sectional view showing a cross section X-X of FIG. 6A. FIG. 6C is a cross-sectional view showing a cross section Y-Y of FIG. 6A. FIG. 6D is a cross-sectional view showing a state in which a pretreatment kit is installed in the filtration port 30.

The filtration port 30 is, for example, a concave portion which constitutes an installation space 30*a* for installing a pretreatment kit. That is, a separation container 50 and a collection container 54 transported from the container holding unit 12 using the transporting arm 24 are installed in the installation space 30*a* in a state of being superposed on each other as shown in FIG. 6D. At this time, the collection container 54 is first accommodated in the installation space 30*a*, and thereafter, the lower portion of the separation container 50 is accommodated in the internal space 54*a* of the collection container 54.

A holding member 31 for holding the collection container 54 so as to sandwich the collection container is provided in the filtration port 30. The holding member 31 is, for example, an U-shaped metal member whose upper portion is open, and constitutes two plate springs whose two arm portions extending upward can be elastically displaced in an inner diameter direction of the filtration port 30.

The two plate spring portions of the holding member 31 have, for example, a curved shape or a bent shape which is recessed inward in a portion between an upper end portion and a lower end portion so that the gap between the plate spring portions becomes narrowest. The gap between the two plate spring portions is larger than the outer diameter of the collection container 54 in the upper end portion and the lower end portion and smaller than the outer diameter of the collection container 54 in the portion in which the gap between the two plate spring portions is narrowest.

In a case where the collection container 54 is inserted into the installation space 30*a* of the filtration port 30, two plate spring portions of the holding member 31 are open in accordance with the lowering of the collection container 54 due to the shape of the above-described holding member 31, and the collection container 54 is held by the installation space 30*a* using the elastic force of the holding member. The collection container 54 is uniformly pressed by the two plate spring portions of the holding member 31 from two directions facing each other and held at the center portion of the installation space 30a. The holding member 31 is fixed in the installation space 30a and does not float with the collection container 54 when the collection container 54 is taken out.

A ring-shaped sealing member 60 having an elastic force is provided at the edge of an upper-surface opening portion of the filtration port 30. The sealing member 60 is fitted, for example, in a recess provided at the edge of the upper-surface opening portion of the filtration port 30. The material of the sealing member 60 is an elastic material, for example, silicone rubber or ethylene-propylene-diene (EPDM) rubber. In a case where the collection container 54 and the separation container 50 are installed in the installation space 30a of the filtration port 30, a lower end of the skirt portion 51 of the separation container 50 abuts on the sealing member 60, and the installation space 30a is sealed by the skirt portion 51. However, the contact portion of the separation container 50 with the sealing member 60 is not limited to be configured by a member having a shape of the skirt portion 51, and can be configured by a contact portion having other various shapes, for example, a flange portion 132.

A flow path 56 for pressure reduction communicates with the installation space 30a from the bottom surface of the filtration port 30. A flow path 57 of a negative pressure load mechanism 55 is connected to the flow path 56. The negative pressure load mechanism 55 includes a vacuum pump and constitutes a negative pressure load unit that loads a negative pressure into the installation space 30a. In a case where the pressure in the installation space 30a is reduced using the negative pressure load mechanism 55 in a state where the separation container 50 and the collection container 54 are accommodated in the filtration port 30, the pressure in the installation space 30a becomes negative.

The internal space 54a of the collection container 54 communicates with the installation space 30a, whose pressure has become negative, via the notches 54d of the collection container 54 and the gap between the inner circumferential surface of the collection container 54 and the outer circumferential surface of the separation container 50. Since the upper surface of the separation container 50 is open to the atmospheric air, a pressure difference is generated between the internal space 50a of the separation container 50 and the internal space 54a of the collection container 54 via the separation layer 52. Accordingly, only components in a sample accommodated in the internal space 50a of the separation container 50 which can pass through the separation layer 52 are separated by the separation layer 52 due to the pressure difference and are extracted to the internal space 54a side of the collection container 54.

Figure 7:
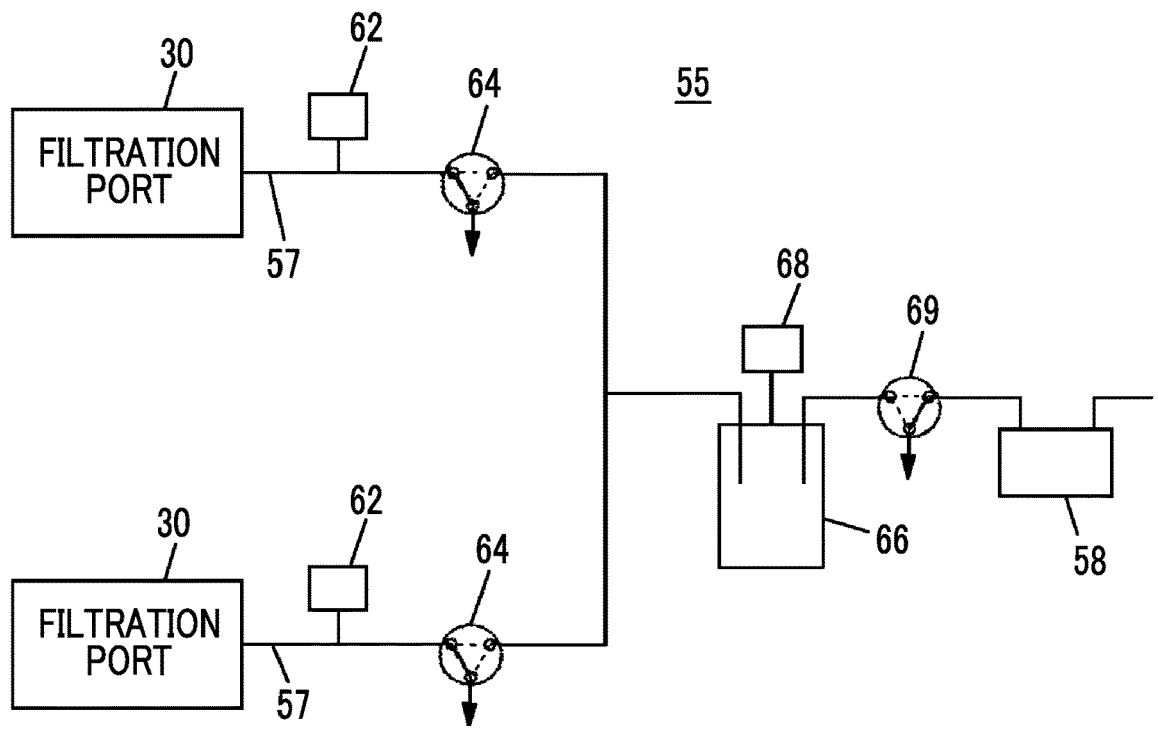
FIG. 7 is a schematic view showing a configuration example of a negative pressure load mechanism.

FIG. 7 is a schematic view showing a configuration example of the negative pressure load mechanism 55. Two filtration ports 30 are connected to a common vacuum tank 66. Each of the filtration ports 30 is connected to the vacuum tank 66 via each flow path 57 in which a pressure sensor 62 and a three-way valve 64 are provided. The pressure in the installation space 30a of each of the filtration ports 30 is detected by each pressure sensor 62. Each three-way valve 64 can be switched to any of a state in which each filtration port 30 is connected to each vacuum tank 66, a state in which the flow path 57 on the filtration port 30 side is open to the atmospheric air (state of FIG. 7), or a state in which an end portion of the flow path 57 on the filtration port 30 is sealed.

The vacuum tank 66 is connected to the pressure sensor 68 and is connected to a vacuum pump 58 via the three-way valve 69. Accordingly, when the three-way valve 69 is switched, it is possible to adjust the pressure in the vacuum tank 66 by connecting the vacuum pump 58 to the vacuum tank 66 as necessary.

When executing processing of extracting a sample in any of the filtration ports 30, the filtration ports 30 are connected to the vacuum tanks 66 and values of the pressure sensors 62 which detect the pressure in the installation spaces 30a of the filtration ports 30 are adjusted so as to become predetermined values. Thereafter, end portions of the flow paths 57 on the filtration ports 30 are sealed. Accordingly, the installation spaces 30a of the filtration ports 30 become a closed system and the decompression condition in the installation spaces 30a is maintained, whereby extraction of a sample is performed.

Referring back to FIG. 2, the pretreatment device 1 includes a sample transfer unit 42 for transferring a sample extracted in a collection container 54 to the automatic sampler 101 side. The sample transfer unit 42 includes a moving unit 44 moving in one direction (arrow direction in FIG. 2) in the horizontal plane, and a transfer port 43 for installing a collection container 54 is provided on the upper surface of the moving unit 44. The moving unit 44 moves due to an operation of a driving mechanism having, for example, a rack-pinion mechanism.

When no sample is transferred to the automatic sampler 101 side, the transfer port 43 is disposed on the orbit (at the position shown by a solid line in FIG. 2) of the holding unit 25 of the transporting arm 24. In this state, installation of a collection container 54 in the transfer port 43 using the transporting arm 24 or collection of the collection container 54 from the transfer port 43 is performed.

When transferring a sample to the automatic sampler 101 side, a collection container 54 for storing an extracted sample is installed in the transfer port 43. Thereafter, the moving unit 44 moves in an outward direction of the pretreatment device 1 and the transfer port 43 is disposed at a position (shown by a broken line in FIG. 2) adjacent to the automatic sampler 101. In this state, the sample in the collection container 54 is sucked by a sampling probe provided in the automatic sampler 101.

When the suction of the sample using the automatic sampler 101 is finished, the moving unit 44 returns to its original position (shown by the solid line in FIG. 2) and the collection container 54 is collected by the transporting arm 24. The used collection container 54 is transported to a disposal port 34 using the transporting arm 24 and discarded. The disposal port 34 is disposed in the vicinity of a dispensing port 32 on the orbit of the holding unit 25 of the transporting arm 24, and used separation container 50 and collection container 54 are discarded therein.

Figure 8:
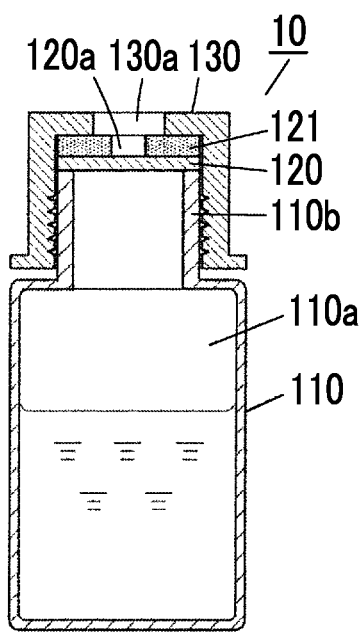
FIG. 8 is a cross-sectional view showing a configuration example of a reagent container.

FIG. 8 is a cross-sectional view showing a configuration example of a reagent container. The reagent container 10 consists of a container main body 110, a septum 120, a water absorbing member 121, and a cap 130. The container main body 110 has an opening on the upper end surface and a space 110a for accommodating a liquid therein. The cap 130 is attached to an upper end portion 110b of the container main body 110 so as to cover the upper end portion 110b of the container main body 110 from above the upper end portion of the container main body in a state in which the septum 120 and the water absorbing member 121 are placed on the upper end surface of the container main body 110. That is, the septum 120 and the water absorbing member 121 are held on the upper end surface of the container main body 110 by the cap 130.

Screws screwed to each other are provided on the outer circumferential surface of the upper end portion 110b of the container main body 110 and the inner circumferential surface of the cap 130. The cap 130 is attached to the upper end portion 110*b* of the container main body 110 by fitting the upper end portion 110*b* in a recess on the lower surface of the cap 130 and relatively rotating the container main body 110 and the cap 130.

The attachment structure of the cap 130 to the upper end portion 110*b* of the container main body 110 is not limited to the screwing of the screws, and the cap 130 may be fixed to the upper end portion 110*b* by engaging a part of the cap 130 with a structure such as a projection or a groove provided in the upper end portion 110*b*.

The opening on the upper end surface of the container main body 110 is sealed by the septum 120. The septum 120 is made, for example, of an elastic material, such as silicone rubber, which has elasticity and through which a probe 26*a* to be described below. A hole formed by the probe 26*a* penetrating therethrough is closed due to the elasticity of the septum 120 after the probe 26*a* is withdrawn, and the sealing of the internal space 110*a* of the container main body 110 is maintained.

The water absorbing member 121 which has water absorbing properties and is made, for example, of filter paper, cotton, gauze, or a water absorptive polymer body (for example, one having a sheet shape) is provided immediately above the septum 120. In the present embodiment, a through hole 120*a* for passing the probe 26*a* is provided at the center portion of the water absorbing member 121 as an example. However, it is unnecessary to provide the through hole 120*a*, and the water absorbing member 121 may have a thickness that can be penetrated by the probe 26*a*.

The outer diameters of the septum 120 and the water absorbing member 121 are substantially the same as that of the upper end portion 110*b* of the container main body 110. Since the outer diameter of the upper end portion 110*b* of the container main body 110 is substantially the same as the inner diameter of the cap 130, the outer diameters of the septum 120 and the water absorbing member 121 are substantially the same as the inner diameter of the cap 130 as well. Accordingly, the septum 120 and the water absorbing member 121 are positioned by the cap 130.

An opening 130*a* for passing the probe 26*a* is provided in the cap 130. The opening 130*a* has an outer diameter larger than that of the probe 26*a* and an inner diameter smaller than the outer diameters of the septum 120 and the water absorbing member 121. Accordingly, the inner lower surface of the cap 130 is engaged with an upper surface peripheral portion of the water absorbing member 121 to prevent the septum 120 and the water absorbing member 121 from falling off from the upper end surface of the container main body 110.

The water absorbing member 121 is provided to prevent water droplets of washing water attached on the outer surface of the probe 26*a* from entering into the internal space 110*a* of the container main body 110 when the washed probe 26*a* is inserted into the internal space 110*a* of the container main body 110 and to prevent not only the entering of washing water, but also entering of a reagent itself into the internal space again after lifting the probe after sucking the reagent.

Figure 9A:
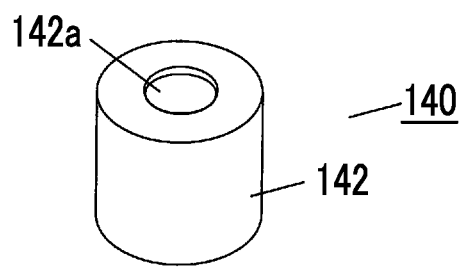
FIG. 9A is a perspective view showing a configuration example of a reagent container holding unit that can hold a 1.5 ml reagent container.
Figure 9A:
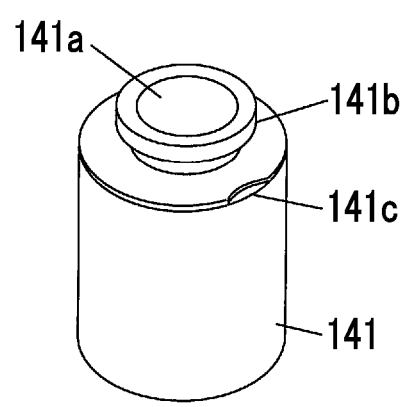
Figure 9B:
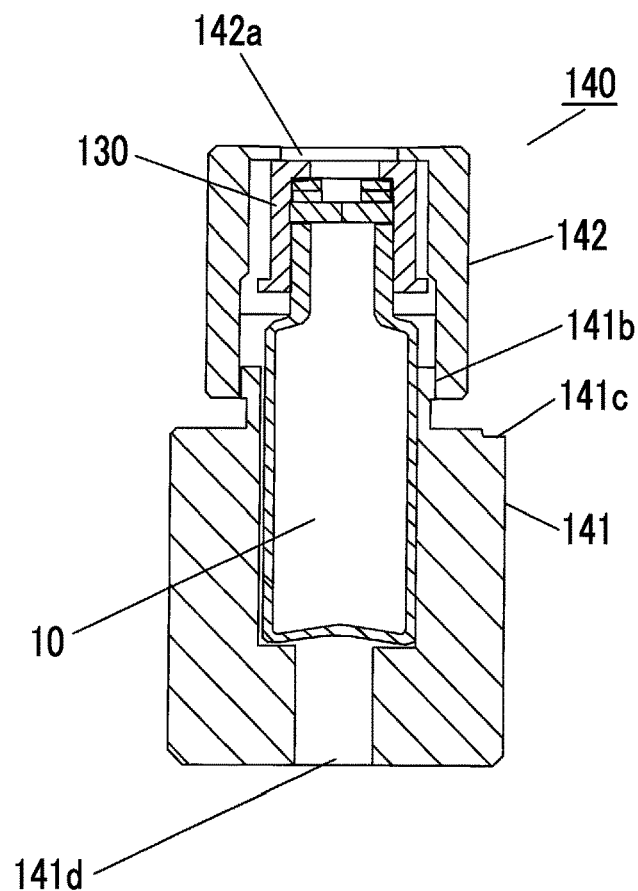
FIG. 9B is a cross-sectional view showing a configuration example of the reagent container holding unit in which the 1.5 ml reagent container is stored and held.

FIG. 9A is a perspective view showing a configuration example of a reagent container holding unit that can hold a 1.5 ml reagent container. FIG. 9B is a cross-sectional view showing a configuration example of the reagent container holding unit in which the 1.5 ml reagent container is stored and held. The reagent container holding unit 140 has a space in which the septum-attached container (reagent container 10) is accommodated. The reagent container holding unit 140 holds the septum-attached container in the space from the side surface direction and a direction perpendicular to the side surface direction. An opening 142*a* into which the probe 26*a* is inserted with respect to the septum 120 of the reagent container 10 to be stored is provided in the reagent container holding unit 140. Hereinafter, the reagent container holding unit 140 will be described in detail.

The reagent container holding unit 140 consists of a container main body 141 and a cap 142. The container main body 141 has an opening 141*a* on the upper end surface and has a space for accommodating the reagent container 10 therein. The inner diameter of the internal space is slightly larger than the outer diameter of the reagent container 10 and has a suitable size when the reagent container 10 is stored therein. The cap 142 can be attached to an upper end portion 141*b* of the container main body 141 in a state in which the reagent container 10 is placed in the internal space from the opening 141*a* of the container main body 141. The opening 142*a* for passing the probe 26*a* and inserting the probe into the reagent container 10 via the septum 120 of the reagent container 10 is provided in the cap 142. In addition, knurling processing for anti-slip may be subjected to the outer circumferential surface of the cap 142.

Screws screwed to each other are provided on the outer circumferential surface of the upper end portion 141*b* of the container main body 141 and the inner circumferential surface of the cap 142. The cap 142 is attached to the upper end portion 141*b* of the container main body 141 by fitting the upper end portion 141*b* in a recess on the lower surface of the cap 142 and relatively rotating the container main body 141 and the cap 142.

The attachment structure of the cap 142 to the upper end portion 141*b* of the container main body 141 is not limited to the screwing of the screws, and the cap 142 may be fixed to the upper end portion 141*b* by engaging a part of the cap 142 with a structure such as a projection or a groove provided in the upper end portion 141*b*.

The opening 142*a* of the cap 142 of the reagent container holding unit 140 has, for example, an inner diameter larger than or equal to that of the opening 130*a* of the cap 130 of the reagent container 10. Accordingly, the probe 26*a* inserted into the opening 142*a* is easily inserted into the opening 130*a* of the cap 130 of the reagent container 10, whereby the probe 26*a* is easily inserted into the reagent container 10.

In addition, a cut-out portion 141*c* which is cut in a circular arc shape is provided at the upper portion of the container main body 141. The cut-out portion 141*c* is, as will be described below, provided on the outer surface of the container main body 141 exposed from the reagent installation unit 8 in a case where the reagent container holding unit 140 is detachably installed in the reagent installation unit 8. A flange portion 160*b* (FIG. 10D) of a pressing knob 160 attached to the reagent installation unit 8 abuts on the cut-out portion 141*c* as will be described below.

The capacity of the reagent container 10 stored in the container main body 141 is 1.5 ml. The reagent container has a size smaller than the appearance of the reagent container holding unit 140 which has a thickness and a thick sole for holding the reagent container therein by filling the gap with the size. An opening portion 141*d* for drainage and weight reduction is provided at the center of the bottom surface of the reagent container holding unit 140.

In addition, a reagent container to be accommodated in the reagent container holding unit 140 is a 1.5 ml reagent container, and therefore, the volume of the contents is small and the reagent container is easily influenced by the external environment such as static electricity. For this reason, it is desirable that the container main body 141 is made of a material, such as aluminum, which has relatively small dielectric constant. The cap 142 may be made of either material such as aluminum or a synthetic resin material such as polypropylene resin.

Figure 10A:
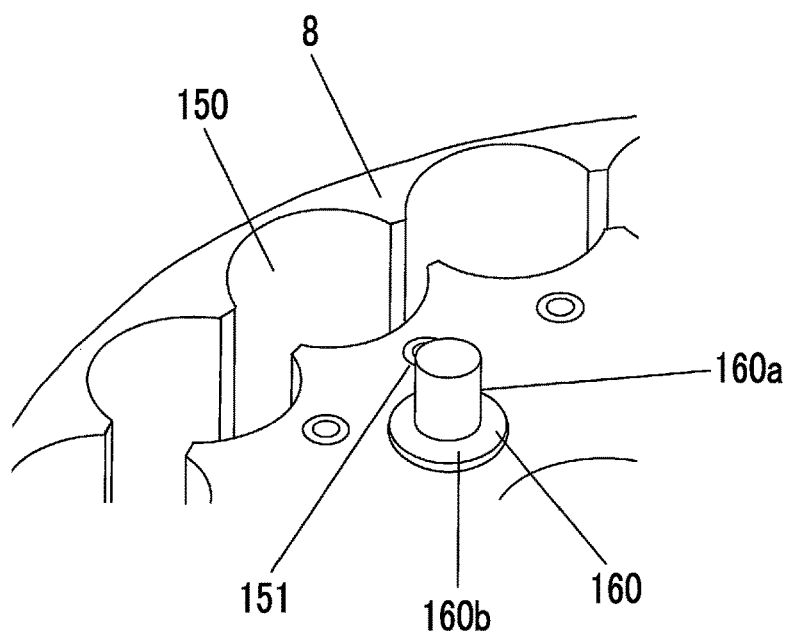
FIG. 10A is a perspective view of a reagent installation unit 8 before the reagent container holding unit is attached thereto.
Figure 10B:
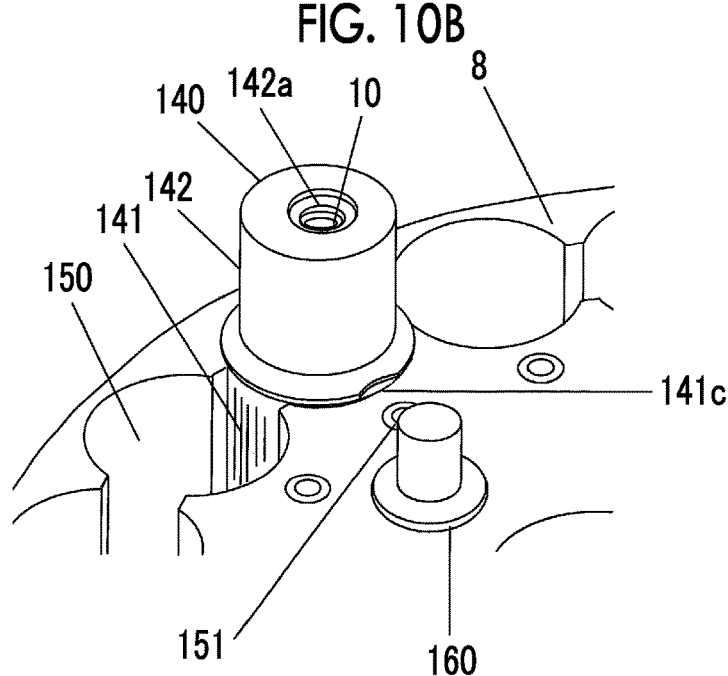
FIG. 10B is a perspective view of the reagent installation unit after the reagent container holding unit of FIG. 9B is attached thereto (before fixation).
Figure 10C:
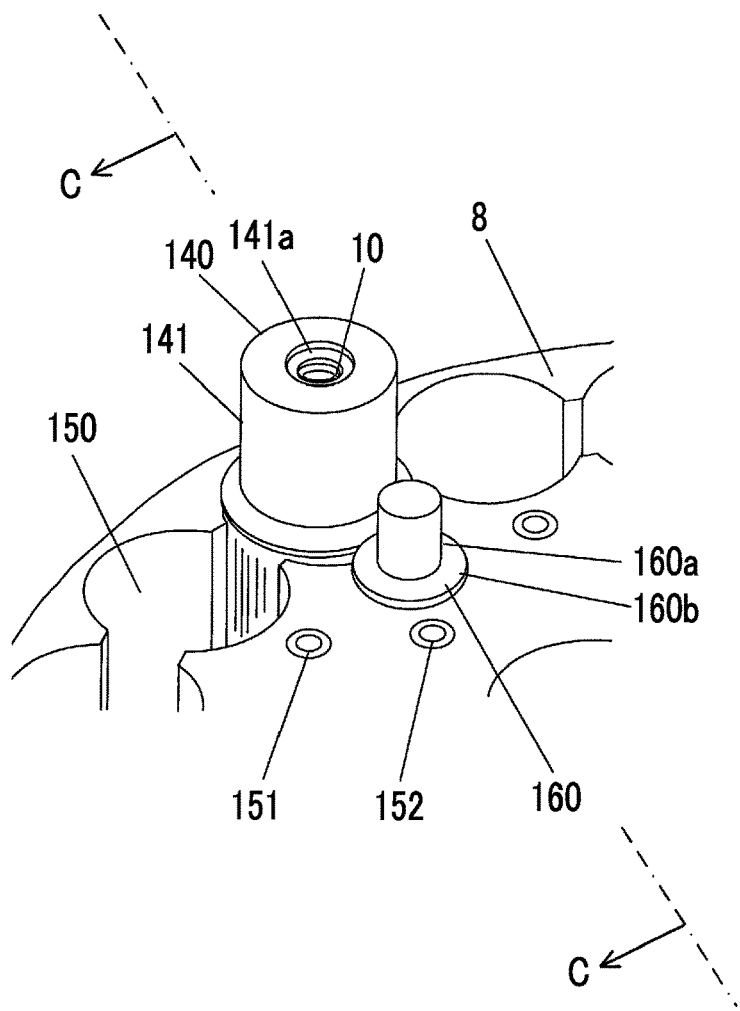
FIG. 10C is a perspective view of the reagent installation unit after the reagent container holding unit of FIG. 9B is attached thereto (after fixation).
Figure 10D:
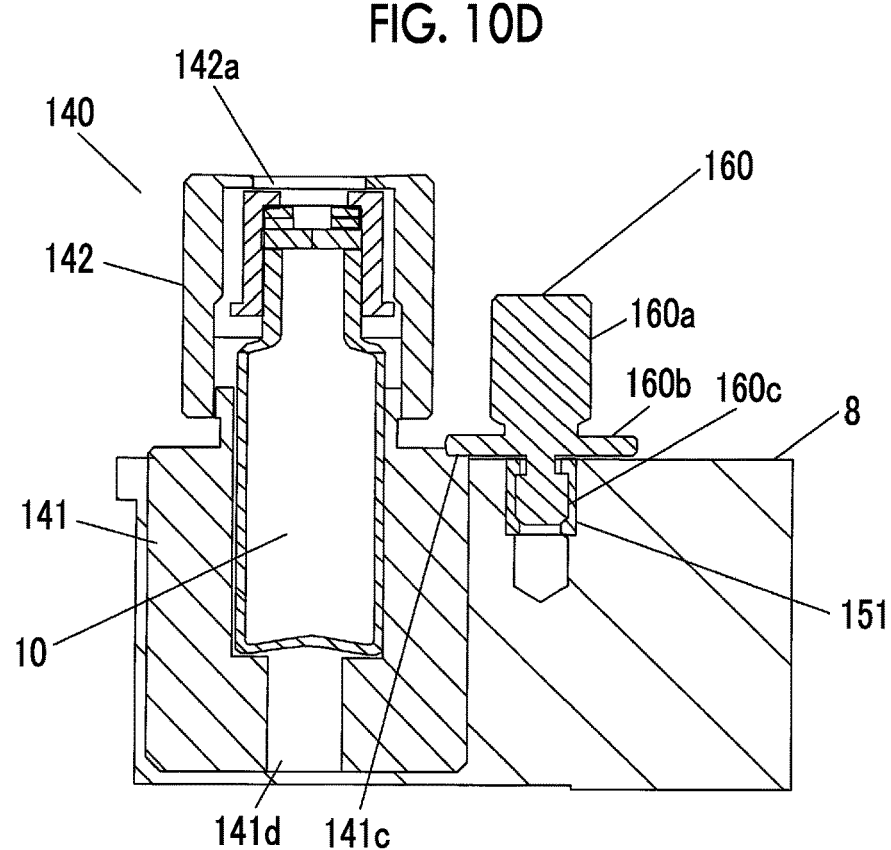
FIG. 10D is a cross-sectional view showing a cross section C-C of FIG. 10C.

FIG. 10A is a perspective view showing the reagent installation unit 8 before the reagent container holding unit is attached thereto. FIG. 10B is a perspective view of the reagent installation unit 8 after the reagent container holding unit of FIG. 9B is attached (before fixation) thereto. FIG. 10C is a perspective view of the reagent installation unit 8 after the reagent container holding unit of FIG. 9B is attached thereto (after fixation). FIG. 10D is a cross-sectional view showing a cross section C-C of FIG. 10C.

In FIG. 10A, the reagent installation unit 8 has an annular shape, and a plurality of installation holes 150 for installing the reagent container holding units 140 are provided in the circumferential direction of the reagent installation unit 8. In addition, a screw hole (fixation hole 151) is provided in the vicinity of each of the installation holes 150. In addition, one or more screw holes (retraction holes 152) are provided at positions farther away from the installation holes 150 than fixation holes 151. A helisert may be buried in the fixation holes 151 and the retraction holes 152 in order to prevent damage to the screw holes. Accordingly, it is possible to prevent damage to the screw holes due to overtightening of screws by a user.

The pressing knob 160 has: a shaft portion 160a having a screw distal portion 160c (FIG. 10D) to be screwed into the screw holes (fixation holes 151 and retraction holes 152) provided in the surface of the reagent installation unit 8; and the flange portion 160b provided at a rear of the screw distal portion 160c. Knurling processing for anti-slip is subjected to the outer circumferential surface of the shaft portion 160a on the proximal side of the pressing knob 160.

In a case where no reagent container holding unit 140 is installed in an installation hole 150, the pressing knob 160 is attached to the retraction hole 152 (FIG. 10C) and retracted. Accordingly, in a case where no reagent container holding unit 140 is installed in the reagent installation unit 8, it is possible to fix the pressing knob 160 on the reagent installation unit 8 so as not to lose it.

Next, as shown in FIG. 10B, a reagent container holding unit 140 in which a reagent container 10 is stored in a container main body 141 and a cap 142 is closed is installed in any of the installation holes 150 of the reagent installation unit 8. The reagent container holding unit 140 can be installed in any installation hole 150. At this time, the cut-out portion 141c is placed toward a fixation hole 151 closest to the installation hole 150 installed in the reagent container holding unit 140.

Next, in a case where the pressing knob 160 disposed in the retraction hole 152 is attached to the fixation hole 151 closest to the installation hole 150 in which the reagent container holding unit 140 is installed as shown in FIG. 10C, a part of the flange portion 160b of the pressing knob 160 is fitted to the cut-out portion 141c of the reagent container holding unit 140. In a case where the screw is tightened by turning the pressing knob 160, the flange portion 160b is also lowered in a direction coming into press-contact with the reagent installation unit 8. Then, the flange portion 160b of the portion fitted to the cut-out portion 141c presses the container main body 141 via the cut-out portion 141c to fix the container main body. Accordingly, the reagent container holding unit 140 does not inhibit movement in the rotational direction in the installation hole 150 and does not float from the installation hole 150.

As shown in FIG. 10D, the reagent container holding unit 140 is installed in the installation hole 150 of the reagent installation unit 8 and the pressing knob 160 is attached to a fixation hole 151 closest to the installation hole 150, in which the reagent container holding unit 140 is installed, through screwing. Then, the flange portion 160b abuts on the cut-out portion 141c, and therefore, it is possible to prevent the reagent container holding unit 140 from floating from the reagent installation unit 8.

Figure 11A:
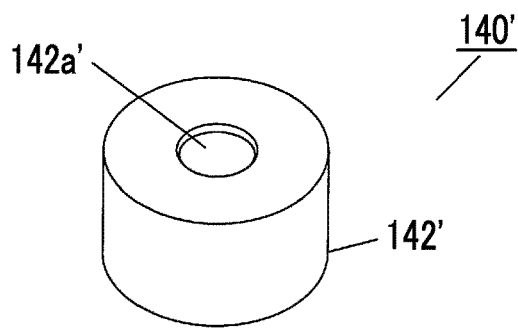
FIG. 11A is a perspective view showing a configuration example of a reagent container holding unit that can hold a 6 ml reagent container.
Figure 11A:
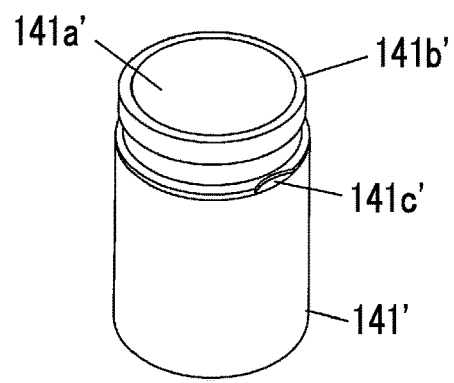
Figure 11B:
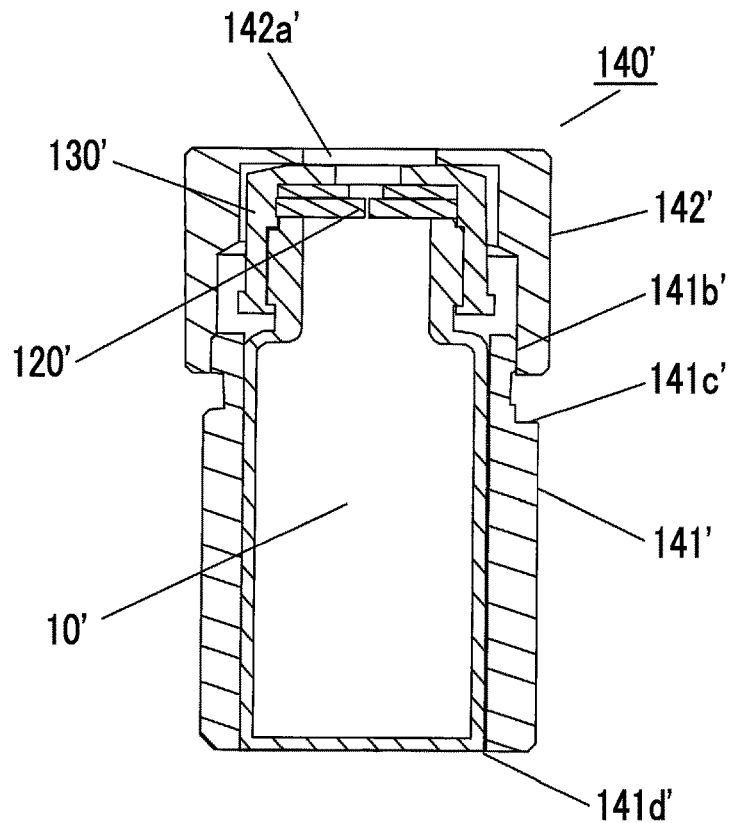
FIG. 11B is a cross-sectional view showing a configuration example of the reagent container holding unit in which the 6 ml reagent container is stored and held.

FIG. 11A is a perspective view showing a configuration example of a reagent container holding unit that can hold a 6 ml reagent container. FIG. 11B is a cross-sectional view showing a configuration example of the reagent container holding unit in which the 6 ml reagent container is stored and held. The reagent container holding unit of FIGS. 11A and 11B is different from the reagent container holding unit of FIGS. 9A and 9B only in the size of the reagent container to be accommodated. Therefore, the corresponding portions will be denoted by the same reference numerals with "'", and the detailed description thereof will not be repeated.

A reagent container holding unit 140' consists of a container main body 141' and a cap 142'. The container main body 141' has an opening 141a' on the upper end surface and has a space for accommodating a 6 ml reagent container 10' therein. The cap 142' can be attached to an upper end portion 141b' of the container main body 141' in a state in which the reagent container 10' is placed in the internal space from the opening 141a' of the container main body 141'. An opening 142a for passing the probe 26a and inserting the probe into the reagent container 10' via a septum 120' of the reagent container 10' is provided in the cap 142'.

A bottom portion 141d' of the container main body 141' may be open, and is open in the case of FIG. 11B.

In addition, a cut-out portion 141c' is provided at the upper portion of the container main body 141'. The cut-out portion 141c' is, as will be described below, provided on the outer surface of the container main body 141' exposed from a reagent installation unit 8 in a case where the reagent container holding unit 140' is detachably installed in the reagent installation unit 8. A flange portion 160b (FIG. 12C) of a pressing knob 160 attached to the reagent installation unit 8 abuts on the cut-out portion 141c' as will be described below.

The container main body 141' and the cap 142' may be made of either material such as aluminum or a synthetic resin material.

Figure 12A:
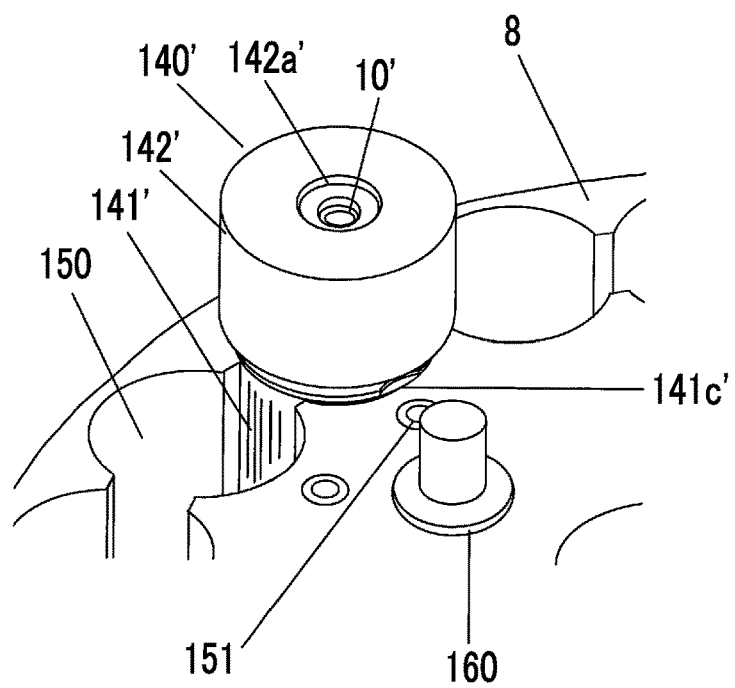
FIG. 12A is a perspective view of a reagent installation unit after the reagent container holding unit of FIG. 11B is attached thereto (before fixation).
Figure 12B:
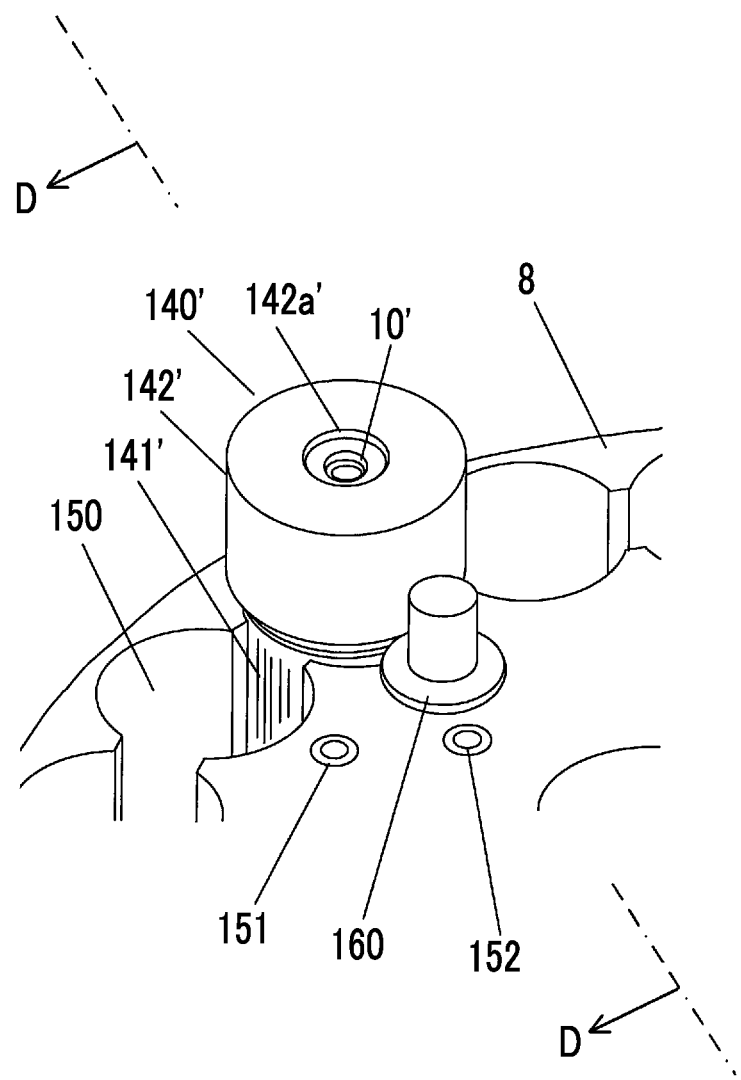
FIG. 12B is a perspective view of a reagent installation unit after the reagent container holding unit of FIG. 11B is attached thereto (after fixation).
Figure 12C:
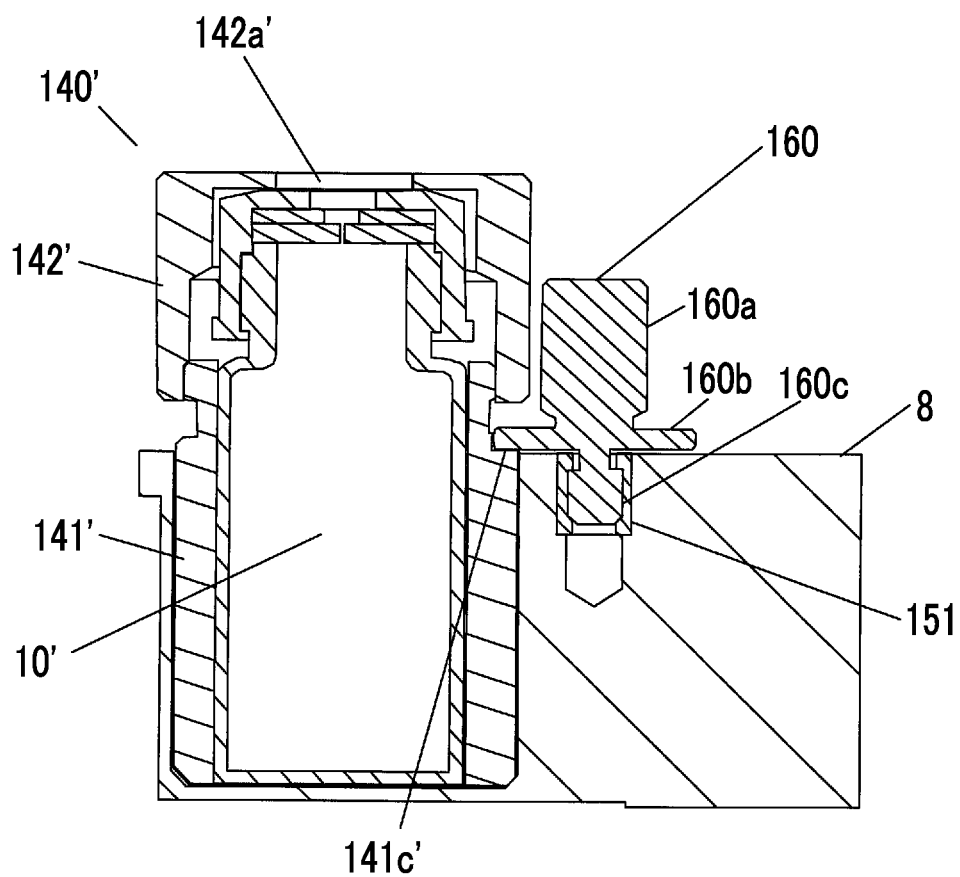
FIG. 12C is a cross-sectional view showing a cross section D-D of FIG. 12B.

FIG. 12A is a perspective view of a reagent installation unit after the reagent container holding unit of FIG. 11B is attached thereto (before fixation). FIG. 12B is a perspective view of a reagent installation unit after the reagent container holding unit of FIG. 11B is attached thereto (after fixation). FIG. 12C is a cross-sectional view showing a cross section D-D of FIG. 12B.

An attachment method performed after attaching the 6 ml reagent container holding unit 140' to the reagent installation unit 8 (before fixation) or a method for fixing the 6 ml reagent container holding unit 140' thereto using the pressing knob 160 is the same as the contents described in FIGS. 10B to 10D, and therefore, the description thereof will not be repeated. Hereinafter, although "'" of reference numerals will not be denoted for convenience of explanation, the description relating to configurations corresponding to reference numerals without "'" also includes configurations corresponding to reference numerals with "'".

According to the present embodiment, it is possible to more efficiently and reliably prevent the septum-attached container from floating from the container installation unit. More specifically, since the septum-attached reagent container is held by the reagent container holding unit 140 fixed to the reagent installation unit 8 using the pressing knob 160, even in a case where the probe 26a penetrating the septum 120 rises after sucking a reagent, the reagent container 10 does not float due to the contact resistance between the septum 120 and the probe 26a. For this reason, there is no error caused by such floating at the time of rising of the probe 26a held at a distal end of the reagent dispensing arm 26 or at the time of rotation of the reagent dispensing arm 26. Therefore, analysis processing does not stop. In addition, it is possible to suppress variation in analytical data due to floating of the reagent container 10.

In addition, simple operations such as storing the reagent container 10 in the reagent container holding unit 140, installing the reagent container holding unit 140 in the reagent installation unit 8, and fixing the reagent container holding unit 140 using the pressing knob 160 are carried out. At that time, the pressing knob 160 can be simply detachable. In addition, in a case where the pressing knob 160 is not used, it can be retracted using the retraction hole 152 on the reagent installation unit 8, thereby preventing loss of the pressing knob 160.

In addition, the reagent containers held by the reagent container holding units 140 in the present embodiment are reagent containers having volumes of 1.5 ml and 6 ml. However, the present invention is not limited thereto and any volume may be employed. In this case, a reagent container holding unit 140 having an internal space corresponding to the size of the volume of a reagent container 10 to be used may be prepared.

In addition, the appearance of the container main body 141 in the present embodiment is cylindrical. However, the present invention is not limited thereto and a polygonal shape may be employed. In this case, the shape of the inner diameter of the installation hole 150 of the reagent installation unit 8 becomes a polygon which is suitable for the appearance of the container main body.

In addition, the pressing knob 160 presses the cut-out portion 141c formed in the container main body 141 in the present embodiment. However, the present invention is not limited thereto and the cut-out portion 141c may be provided in the cap 142, for example. More specifically, a cut-out portion may be provided in a part of the outer surface in the periphery of the opening portion of the cap 142 attached to the upper end portion 141b of the container main body 141 and a part of the flange portion 160b of the pressing knob 160 may abut on the cut-out portion to fix the reagent container holding unit 140 to the installation hole 150 of the reagent installation unit 8, for example.

In the above-described embodiment, a case where a reagent is accommodated in the reagent container 10 has been described. However, the liquid to be accommodated in the reagent container 10 is not limited to the reagent, and may be other liquids such as an internal standard liquid or a sample. In this case, the septum-attached container is not limited to the reagent container 10, and may be installed in a container installation unit (for example, the sample installation unit 2) which is different from the reagent installation unit 8.

As described above, the pretreatment device according to an example of the present embodiment is a pretreatment device (for example, a pretreatment device 1) for performing pretreatment using a liquid sucked by a probe (for example, a probe 26a) from an inside of a septum-attached container (for example, a reagent container 10), the pretreatment device including: a container holding unit (for example, a reagent container holding unit 140) which has a space for accommodating the septum-attached container and is provided with a hole (for example, an opening 142a) into which the probe is inserted with respect to a septum (for example, a septum 120) of the septum-attached container to be stored; an installation unit (for example, a reagent installation unit 8) in which the container holding unit is detachably installed; and a fixing unit (for example, a pressing knob 160) which fixes the container holding unit to the installation unit in a state where the container holding unit is detachably installed in the installation unit.

According to such a configuration, it is possible to more efficiently and reliably prevent the septum-attached container from floating from the container installation unit.

The container holding unit (for example, the reagent container holding unit 140) may include a container holder member (for example, a container main body 141) which has an opening in one end surface, internally holds the septum-attached container in a space for accommodating the septum-attached container, and is fixed to the installation unit (for example, the reagent installation unit 8) by bringing a part of the container holding unit into abutment against the fixing unit, and the container holding unit includes a cap member (for example, a cap 142) which is provided with the hole (for example, the opening 142a) and is attached to the upper end portion (for example, an upper end portion 141b) of the container holder member to hold the septum-attached container to be stored.

According to such a configuration, since the septum-attached container is held by the container holding unit fixed to the installation unit using the fixing unit, even in a case where the probe penetrating the septum rises after sucking a reagent, the septum-attached container does not float due to the contact resistance between the septum and the probe. In addition, since the container holding unit consists of the container holder member and the cap member, it is possible to easily store the septum-attached container in the container holding unit simply by placing the septum-attached container in the container holder and capping the cap member for tightening.

The container holder member (for example, the container main body 141) may be made of resin or aluminum.

According to such a configuration, the material of the container holder member may be selected according to the degree of influence of the external environment on the contents of the septum-attached container to be stored in the container holding unit, for example. Aluminum may be selected as the material of the container holder member in order to prevent the contents from being difficult to be sucked since the amount of the contents of the septum-attached container is small and contents are scattered on the inner wall surface of the container due to an external influence such as static electricity, for example. In addition, resin may be selected as the material of the container holder member in consideration of cost or weight reduction.

The fixing unit (for example, the pressing knob 160) may include a shaft portion (for example, a shaft portion 160a) having a screw distal portion screwed into a screw hole provided in a surface of the installation unit and a flange portion (for example, a flange portion 160b) provided at a rear of the screw distal portion, and in which the container holding unit (for example, the reagent container holding unit 140) includes a cut-out portion (for example, a cut-out portion 141c) which is provided on an outer surface of the container holding unit exposed from the installation unit (for example, the reagent installation unit 8) in a case where the container holding unit is detachably installed in the installation unit and on which the flange portion of the fixing unit (for example, the pressing knob 160) which is attached to the installation unit through screwing with the shaft portion abuts.

According to such a configuration, it is possible to prevent rotation of the septum-attached container held by the container holding unit or vertical movement of the septum-attached container by fixing the container holding unit to the installation unit.

The cut-out portion (for example, the cut-out portion 141c) may be provided in a part of the outer surface of the container holder member exposed from the installation unit in a case where the container holder member (for example, the container main body 141) is detachably installed in the installation unit (for example, the reagent installation unit 8).

According to such a configuration, it is possible to simply fix the container holding unit to the installation unit.

The installation unit (for example, the reagent installation unit 8) may be a rotary table in which one or a plurality of the container holding units is detachably installed.

According to such a configuration, it is possible to detachably install the container holding unit simply to the rotary table of the pretreatment device. In addition, the rotary table may be removed as it is at night after the completion of measurement and placed in the refrigerator as it is.

The installation unit (for example, the reagent installation unit 8) may include a retraction portion (for example, a retraction hole 152) in which the fixing unit is retracted and installed in a case where the container holding unit is not installed.

According to such a configuration, in a case where the fixing unit is not used, it can be retracted on the installation unit, thereby preventing loss of the fixing unit.

The present aspect has been described above based on the embodiment and modification examples. However, the embodiment of the above-described aspect is for facilitating understanding of the present aspect, and therefore, does not limit the present aspect. The present aspect can be modified and improved without departing from the gist thereof and the scope of claims, and the present aspect includes its equivalents. In addition, in a case where the technical features are not described as being essential in the present specification, these can be deleted as appropriate.

What is claimed is:

1. A pretreatment device for performing pretreatment using a liquid sucked by a probe from an inside of a septum-attached container, the pretreatment device comprising:

a container holding unit which has a space for accommodating the septum-attached container and is provided with a hole into which the probe is inserted with respect to a septum of the septum-attached container to be stored;

an installation unit in which the container holding unit is detachably installed; and a fixing unit which fixes the container holding unit to the installation unit in a state where the container holding unit is detachably installed in the installation unit;

wherein the fixing unit includes a shaft portion having a screw distal portion screwed into a screw hole provided in a surface of the installation unit and a flange portion provided at a rear of the screw distal portion, and wherein the container holding unit includes a cut-out portion which is provided on an outer surface of the container holding unit exposed from the installation unit in a case where the container holding unit is detachably installed in the installation unit and on which the flange portion of the fixing unit which is attached to the installation unit through screwing with the shaft portion abuts.

2. The pretreatment device according to claim 1, wherein the container holding unit includes a container holder member which has an opening in one end surface, internally holds the septum-attached container in a space for accommodating the septum-attached container, and is fixed to the installation unit by bringing a part of the container holding unit into abutment against the fixing unit, and a cap member which is provided with the hole and is attached to the upper end portion of the container holder member to hold the septum-attached container to be stored.

3. The pretreatment device according to claim 2, wherein the container holder member is made of resin or aluminum.

4. The pretreatment device according to claim 1, wherein the cut-out portion is provided on a part of the outer surface of a container holder member exposed from the installation unit in a case where the container holder member is detachably installed in the installation unit.

5. The pretreatment device according to claim 1, wherein the installation unit is a rotary table in which one or a plurality of the container holding units is detachably installed.

6. The pretreatment device according to claim 1, wherein the installation unit includes a retraction portion in which the fixing unit is retracted and installed in a case where the container holding unit is not installed.

* * * * *